United States Patent [19] [11] 4,297,623
Dupont [45] Oct. 27, 1981

[54] SYSTEM FOR CONTROLLING A SEPARATELY EXCITED CONSTANT LOAD DC ELECTRIC MOTOR

[75] Inventor: Jean M. Dupont, Paris, France

[73] Assignee: Compagnie Internationale pour l'Informatique CII-Honeywell Bull, Paris, France

[21] Appl. No.: 914,987

[22] Filed: Jun. 12, 1978

[30] Foreign Application Priority Data

Jun. 20, 1977 [FR] France .................. 77 18874

[51] Int. Cl.³ ............................................. H02P 5/16
[52] U.S. Cl. .................................. 318/410; 318/278; 318/391; 318/407
[58] Field of Search .............. 318/415, 430, 395, 331, 318/263, 278, 410, 407, 416, 386, 391; 242/75, 51, 186; 226/188

[56] References Cited

U.S. PATENT DOCUMENTS

| 3,181,050 | 4/1965 | Berman | 318/356 |
|---|---|---|---|
| 3,185,364 | 5/1965 | Kleist | 226/188 |
| 3,359,477 | 12/1967 | Wasai et al. | 318/395 |
| 3,394,294 | 7/1968 | Leroi et al. | 318/615 |
| 3,593,087 | 7/1971 | Pantelakis | 318/331 |
| 3,683,252 | 8/1972 | Maynard | 318/331 |
| 3,697,844 | 10/1972 | Dinger | 318/331 |
| 3,706,020 | 12/1972 | Klang | 318/400 |
| 4,010,411 | 3/1977 | Wisman | 318/331 |

FOREIGN PATENT DOCUMENTS 2290082 5/1976 France .
1102269 2/1968 United Kingdom .

*Primary Examiner*—David Smith, Jr.
*Attorney, Agent, or Firm*—Lowe, King, Price & Becker

[57] ABSTRACT

A separately excited constant load DC electric motor is controlled in response to a source of current for the desired motor speed. Current from the source applied to the motor armature is modified by a motor loss simulator circuit responsive to the source. The circuit simulates the losses the motor is expected to have in response to the current derived from the source, whereby the actual motor speed corresponds with the desired motor speed despite the loss. The losses are simulated during acceleration and deceleration as well as steady state intervals of the current source, which can be actuated to drive the motor in both directions.

15 Claims, 6 Drawing Figures

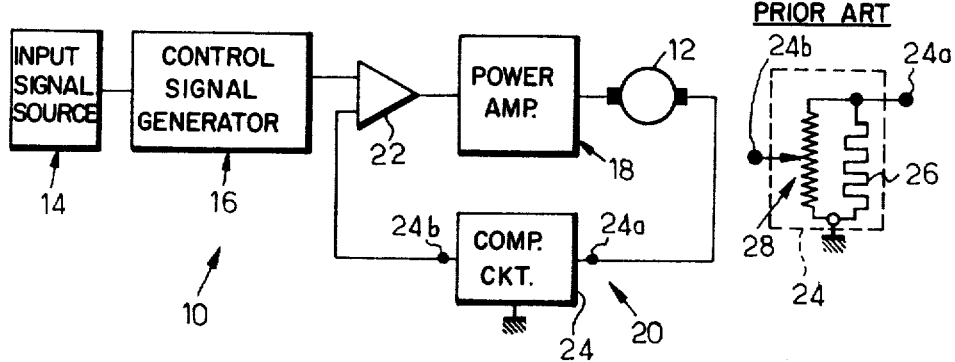
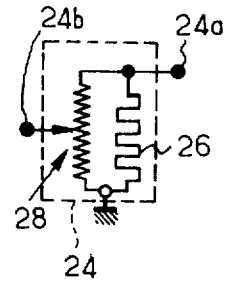
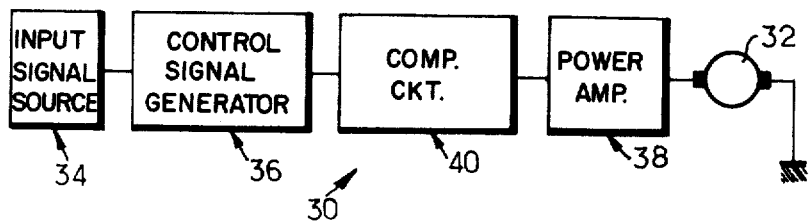
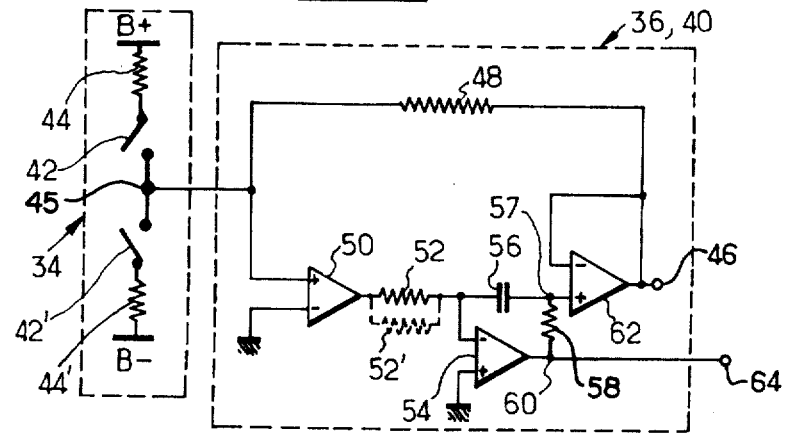

//{}

SYSTEM FOR CONTROLLING A SEPARATELY EXCITED CONSTANT LOAD DC ELECTRIC MOTOR

FIELD OF THE INVENTION

The present invention relates to a system for controlling a separately excited, constant load DC electric motor, and more particularly to such a system in which compensation is made for the losses occurring in the motor as a function of a signal controlling the desired motor speed.

BACKGROUND OF THE INVENTION

Separately excited DC electric motors are often used because the speed thereof can be adjusted over a wide range by varying the supply voltage for the motor. In theory, for a given supply voltage and flux, the load characteristic of these motors is independent of the direct current which flows through them. However, it is observed in practice that the motor speed decreases linearly in response to energizing current increases. The speed decrease is due to resistive losses which occur as a result of the motor internal resistance, which is the sum of the resistances of the motor armature and the commutator windings. A formula which represents this phenomenon is:

$$E = U - RI,$$

where:
- E = the electromotive force of the motor,
- U = the motor supply voltage,
- R = the motor internal resistance, and
- I = the motor armature current.

The product RI represents the motor internal resistive or voltage drop. In cases where the motor operates at a constant supply voltage, increases in the shaft speed are regulated by varying the control current I, which must increase to reduce the time required for the shaft speed to increase and decrease. Consequently, if it is desired to adjust the shaft speed quickly, a considerable resistive drop develops to greatly upset the adjustment process. This is why separately excited DC electric motors which are used under these conditions have control systems including a loss compensating arrangement which enables the required speed to be reached in the required time.

A common prior art system for controlling a separately excited DC electric motor comprises a generator for deriving a control signal for the motor speed, a power amplifier connected to drive the motor in response to the control signal to adjust the motor speed, and a feedback loop for compensating, as a function of the control signal, for motor losses. The feedback loop feeds back a signal proportional to the motor current to the input of the amplifier. To derive the signal proportional to the motor current, a small feedback resistor is placed in series with the motor armature to derive a voltage proportional to the amplitude of the motor armature current.

A compensating feedback loop of this nature has been found to be ineffective when it is desired to adjust the motor speed very rapidly, equivalent, for example, to the time required for the motor commutator to turn past one or a few bars or strips. In such a case, slots between the bars produce a very irregular signal in the feedback resistor. The irregular signal includes one or a few current surges which, even when effectively filtered, cannot be used as a feedback signal. Thus, there is only an advantage in using this kind of compensating feedback loop when the required speed changes are equivalent to the commutator turning past many bars, so that a suitable feedback signal can be obtained. If there is a small angle through which the commutator turns while the speed is changing, the compensating arrangement is ineffective.

The invention proposes a control system which employs a compensating circuit having the advantage of being effective regardless of the commutator rotation angle. The improved compensating circuit is also of a very simple construction, and dispenses with a feedback resistor which necessarily adds to the internal resistance of the motor in conventional control systems.

BRIEF DESCRIPTION OF THE INVENTION

According to the invention, a separately excited, constant load DC electric motor is controlled by an improved motor loss compensating circuit including a motor loss characteristic simulator circuit responsive to a motor control signal derived from a generator. The circuit derives a motor loss representing signal which is combined with the control signal in such a way that the speed of the motor corresponds to the required speed.

It is, accordingly, an object of the invention to provide a new and improved compensating circuit for a separately excited DC motor.

Another object of the invention is to provide a new and improved compensating circuit which is capable of very rapidly adjusting the speed of a separately excited DC motor.

A further object of the invention is to provide a circuit capable of adjusting the speed of a separately excited DC motor during the interval required for the motor commutator to pass one or a few bars.

An additional object of the invention is to provide a new and improved compensating circuit for a separately excited DC motor wherein there are no armature losses introduced as a result of the compensating circuit.

The advantages and features of the invention will be clearly apparent from the following description, which is given with reference to the accompanying drawings.

BRIEF DESCRIPTION OF THE DRAWINGS

FIG. 1 is a block diagram of a common system for controlling a separately excited, constant load DC electric motor;

FIG. 2 is a schematic drawing of a circuit as generally used in a control system shown in FIG. 1;

FIG. 3 is a block diagram of a system according to the invention for controlling a separately excited, constant load DC electric motor;

FIG. 4 is a general circuit diagram of a compensating circuit according to the invention;

DETAILED DESCRIPTION OF THE INVENTION

Figure 5:
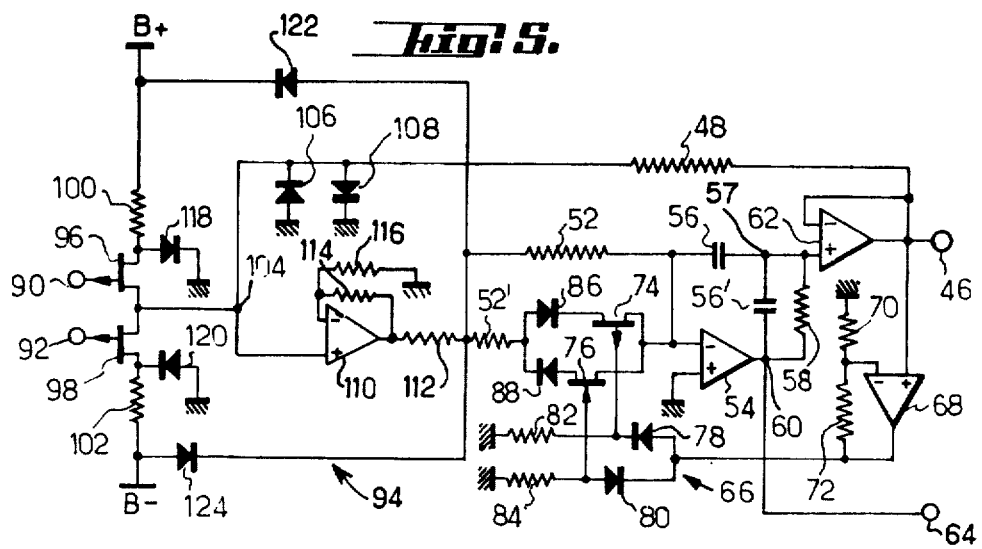
FIG. 5 is a schematic diagram of an actual compensating circuit which is based on the general circuit diagram of FIG. 4.

In FIG. 1, a system 10 for controlling a separately excited DC electric motor 12 includes an input signal source 14, such as a push button keyboard. Generator 16 responds to the signal derived by source 14 to generate a control signal for the motor by determining the speed corresponding to the signal received from source 14 and the time required to reach this speed. Power amplifier 18 drives the armature of motor 12 in response to the control signal derived by the generator 16. Circuit 20 responds to a signal indicative of the current supplied to the motor to develop a compensating signal for the motor internal resistance drop.

A compensating arrangement of the conventional kind servo-controls motor 12 by means of a feedback loop including differential amplifier 22 and feedback unit 24. In accordance with the familiar principles of servo-control, differential amplifier 22 has first and second inputs respectively responsive to the control signal derived from generator 16 and the signal produced at the output of feedback unit 24.

Unit 24 includes a very low impedance resistor having one grounded terminal and a second terminal 24a connected in series with the armature of motor 12, as illustrated in FIG. 2. Connected in parallel with resistor 26 is a fixed, high impedance resistive potentiometer 28 having a tap forming output 24b of feedback unit 24. In certain cases feedback unit 24 includes a filtering network (not shown) for the reasons given above.

The operation of control system 10 is now explained with reference to waveforms of FIG. 6. Assume that waveforms A and B represent the signals derived from source 14. Waveform A orders motor 12 to run in the forward direction during periods t1-t2 and t4-t5, while signal B orders the motor to run in reverse during interval t3-t4.

Waveform C represents a control signal which generator 16 derives in response to waveforms A and B to control the required speed change pattern. Thus, starting in the forward direction occurs during the period t1-t'1 and stopping in the forward direction during the period t2-t'2. It is assumed that normal circumstances occur so the starting and stopping periods differ. Starting and stopping in the reverse direction respectively occur between times t3-t'3 and t4-t'4. Since time t'4 occurs during the interval t4-t5, while the signal commanding running in the forward direction is derived, generator 16 determines the predetermined period of forward starting, which extends between times t'4 and t"4. At time t5 which corresponds to the derivation of the stop forward running signal from source 14, generator 16 orders a stop in the predetermined stop period t5-t'5.

Since the predetermined starting periods are shorter than the predetermined stopping periods, the current which flows through the motor 12 must be greater during starting than during stopping, as shown by the waveform of FIG. 6E. These differing currents cause different resistive drops in the armature of motor 12 at the terminals of the resistor 26 in the feedback unit 24. Differential inputs of differential amplifiers 22 respectively respond to control signal C, derived by generator 16, and the output signal from terminal 24b of feedback unit 24.

As mentioned above, the resistance of feedback unit 24 adds to the internal resistance of motor 12 and the unit is disturbed by interference, pulse type signals which are introduced into the feedback signal by edges of the commutator bars; the interference signals cannot effectively be filtered if there are only a few interfering pulses during the acceleration (starting) and deceleration (stopping) intervals.

FIG. 3 is a block diagram of a system 30, according to the invention, for controlling a separately excited, constant load DC electric motor 32. As in prior art system 10, control system 30 comprises input signal source 34, a control signal generator 36, similar to generator 16, and a power amplifier 38 which energizes motor 32 so the motor speed corresponds to the desired speed indicated by the control signal produced by generator 36. Control system 30 according to the invention differs from the prior art control system 10 by employing a compensating circuit 40 which is connected in series between generator 36 and the input to power amplifier 38, while motor 32 is connected directly to ground.

Figure 6:
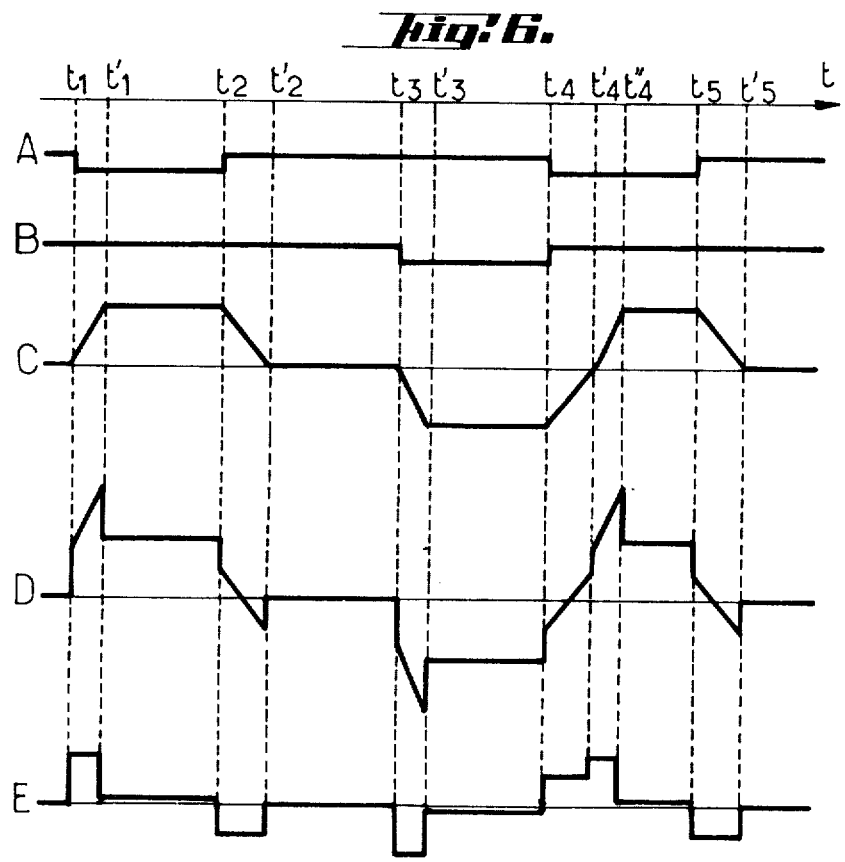
FIG. 6 is a series of waveforms derived at various points of the control systems shown in FIGS. 1 to 5.

In FIG. 6 is shown the principle employed by the invention for compensating losses by the resistive armature drop. As mentioned supra, the resistive drop corresponds to the product of the internal motor resistance and the value of the current flowing through the motor. Because the internal motor resistance is a relatively fixed characteristic and the motor current is a known function of the motor inertia and acceleration, the resistive drop causes a linear reduction in the motor electromotive force, in conformity with the previously stated equation $E = U - RI$. To cancel the resistive drop effects, the supply current and motor internal resistance are simulated by combining a loss signal representing the internal motor drop, as a function of the control signal supplied by the generator 36, with the control signal in such a way that the supply voltage to the motor produces the required speed. In other words, the product RI is simulated to form a loss signal $S_p$, which is added to the control signal U so that the electromotive force $E = U + S_p RI = U$. Because source 34 is operated in the same way as source 14 in FIG. 1 and generator 36 therefore derives the same control signal C, FIG. 6, as is derived by generator 16, the compensating circuit 40 supplies signal D to amplifier 38. Signal D is the sum of signal C and a component proportional to current I, as represented by waveform E in FIG. 6; wavefore E occurs during the motor starting and stopping periods.

In other words, compensating circuit 40 responds to the control signal derived from generator 36 to generate a signal representing the losses occurring in motor 32, and combines the loss representing signal with the control signal from generator 36, so the motor speed corresponds to the desired speed. FIG. 4, a general diagram of the combination formed by signal source 34, generator 36 and compensating circuit 40, shows how easily the invention is put into practice.

Signal source 34, FIG. 4, causes motor 32 to run in the forward and reverse directions by including two switches 42 and 42', respectively connected in series between opposite polarity DC voltage sources B+ and B− by resistors 44 and 44'. The embodiment of generator 36 and compensating circuit 40 illustrated in FIG. 4 has the advantage of combining the generator and compensating circuit, as seen infra.

A feed forward circuit including resistor 48 connects common terminal 45 for switches 42 and 42' to terminal 46 so the voltage at the terminal represents the desired steady state speed of motor 32. The signal at terminal 46 controls circuits 36,40, as well as generator 34, as indicated infra with regard to FIG. 5. In FIG. 4, terminal 45 is also connected to non-inverting input (+) of differential amplifier 50, having a grounded inverting input (−). Differential amplifier 50 has an output connected by resistor 52 to an inverting input (−) of differential amplifier 54, having a grounded non-inverting feedback path including series capacitor 56 and resistor 58, connected between output terminal 60 and the inverting input terminal of amplifier 54. Terminal 60 of differential amplifier 54, is connected to terminal 64, the output of compensating circuit 40 from which is extracted input signal D, FIG. 6, for power amplifier 38. Common terminal 57 for capacitor 56 and resistor 58 is connected to noninverting input (+) of buffer differential amplifier 62, having a negative feedback loop whereby the amplifier output terminal 46 and inverting input (−) are directly connected.

The amplitude of a constant voltage supplied to motor 32 after the motor has started is determined by the values of each of supply voltages B+, B−, resistors 44, 44' and 48. The time required for motor 32 to start and stop is set by the circuit including amplifiers 50, 54 and 62, as well as resistors 52 and 58, and capacitor 56; this circuit is in parallel with resistor 48. Differential ampifier 50 is a buffer, while differential amplifier 54 is an integrator by virtue of capacitor 56 and resistor 52. Consequently, the slope of signals C and D in the starting and stopping periods is determined by the values of resistor 52 and capacitor 56. In the general case where the starting, i.e., accelerating, and stopping, i.e., deceleration, periods differ, the integration constant for the integrating amplifier must be altered so they differ during these periods. In the illustrated example, where the starting period is shorter than the stopping period, resistor 52 and capacitor 56 form a time constant for the stopping period. A shorter starting time constant is established by connecting resistor 52' in parallel with resistor 52 to lower the resistance in the signal path at the inverting input of amplifier 54. If terminal 57 were connected directly to terminal 60, differential amplifier 62 would supply terminal 46 with the required control signal C for motor 32, assuming that the control signal voltage after starting is determined by the voltage supplied by feed forward resistor 48 to terminal 46 as seen above.

Compensating circuit 40, FIG. 3, is formed by adding resistor 58 between terminals 57 and 60. The voltage between terminals 57 and 60 is proportional to the current flowing through motor 32 because: (1) the motor internal voltage drop is proportional to the current flowing through the motor, (2) the motor current is inversely proportional to the required starting and stopping times and thus to the integration constants of differential amplifier 54, and (3) the current in resistor 52 (which determines the stopping time-constant) or in resistors 52 and 52' (which determine the starting time-constant) is the same as that flowing through resistor 58. The internal drop is simulated by adjusting the value of resistor 58 to ensure that the voltage between terminals 57 and 60 equals the motor internal drop IR. The voltage between terminals 57 and 60, representing the motor internal drop, is added to the integrated voltage, at output terminal 60 of amplifier 54, which represents the slope of signal C during the starting and stopping periods, so that the voltage at terminal 64 is illustrated by waveform D, FIG. 6.

FIG. 5 is a circuit diagram of an actual circuit based on the general circuit diagram shown in FIG. 4. Thus, components which are the same as those in FIG. 4 are shown in FIG. 5 with the same references. The two chief differences are (1) a decoupling capacitor 56' in parallel with resistor 58 to simulate the motor internal drop, and (2) a switching network 66 to connect or disconnect resistor 52' depending upon whether the period corresponds to the starting or stopping of the motor.

Switching network 66 is relatively simple and responds to the output signal from terminal 46, as applied to a non-inverting input of differential amplifier 68, having an inverting input (−) connected to ground via resistor 70 and to negative feedback resistor 72, connected to the amplifier output. The output of amplifier 68 is connected to a pair of biasing circuits respectively provided for opposite conductivity type field-effect transistors 74 and 76. The biasing circuits respectively comprise diodes 78,80 respectively connected in series with grounded resistors 82,84. Transistors 74 and 76 include gates respectively connected to the common terminals for diodes 78,80 and resistors 82,84. Source electrodes of transistors 74 and 76 are connected in parallel to the inverting input (−) of differential amplifier 54, while drain electrodes of these transistors are connected to one terminal of resistor 52' via diodes 86 and 88 which are biased to conduct current in the same direction as transistors associated with them.

The circuit illustrated in FIG. 5 includes input terminals 90 and 92 respectively responsive to input signals (such as signals A and B, FIG. 6) commanding the motor to run forward and in reverse. The signals at terminals 90 and 92 are processed by an input circuit 94 containing like conductivity type field effect transistors 96 and 98, having gate electrodes respectively connected to input terminals 90 and 92. Resistors 100 and 102 are respectively connected between drain electrodes of transistors 90 and 92 and B+ and B− supply voltage source terminals, while source electrodes of these transistors have a common terminal 104, in turn connected to resistor 48. Oppositely polarized diodes 106 and 108 shunt terminal 104 to ground. Terminal 104 is also connected to a non-inverting input of a differential amplifier 110, having an output connected to resistor 112. Amplifier 110 includes a negative feedback resistor 114 between its output and inverting input, also connected to ground by resistor 116. Oppositely polarized diodes 118 and 120 respectively shunt the drains of transistors 96 and 98 to ground, while oppositely polarized, series diodes 122 and 124 limit the maximum voltage applied by sources B+ and B− to resistors 52 and 52'.

In response to positive and zero voltages being respectively applied to terminals 92 and 90, whereby transistors 98 and 96 are respectively conducting and cut off to order motor 32 to run forward, the voltage at terminal 64 changes as a function of the values of supply voltage B− and resistors 102 and 48. With transistor 98 conducting, a negative DC voltage is coupled from source B− to terminal 104; the voltage at terminal 104 is limited by the junction voltage of diode 106. In response to the negative voltage at terminal 104, amplifier 68 develops a negative voltage that is coupled through diode 80 to forward bias transistor 76, whereby resistor 52' is connected in parallel with resistor 52 during starting interval t1-t'1 so the time constant of integrating amplifier 54 is relatively low. Amplifier 54 responds to the output of amplifier 110, which, under the stated conditions, is a negative voltage proportional to the voltage at terminal 104. The negative voltage at terminal 104 is converted by amplifier 54 into a voltage having three superimposed components. One of the components is a positive going linear ramp having a slope inversely proportional to the combination of parallel resistors 52 and 52' multiplied by capacitor 56. The second component is a constant positive DC level having a value determined by the value of resistor 58 divided by the parallel value of resistors 52 and 52'. The third component is a negative going exponential ramp having a time constant determined by the product of the values of resistor 58 and capacitor 56. By selecting the value of capacitor 56' to be sufficiently large, the third component can be effectively ignored so the signal at terminal 64 is a ramp superimposed on a constant value during interval t1-t'1 as indicated by waveform D.

Because resistor 58 and capacitor 56 are connected between terminals 57 and 60, the voltage coupled from terminal 57 to amplifier 62 is essentially a positive going ramp. The positive going ramp 62 is combined by amplifiers 62 and 68 with the negative voltage fed through resistor 48. In response to the combined voltage at the output of amplifier 68 reaching a predetermined level at time t'1, diode 80 becomes back biased, causing transistor 76 to open circuit, so resistor 52' is no longer effectively connected in parallel with resistor 52 to the input of amplifier 54, to increase the input impedance to amplifier 54. Simultaneously with transistor 76 being back biased, a threshold sensing circuit (not shown) responds to the output of amplifier 68 to remove the forward bias on transistor 98, so zero input voltage is applied to integrating amplifier 54. The output of amplifier 54 therefore remains constant at the same level it has at instant t'1.

At time t2 generator 36 applies a forward bias to terminal 90 so transistor 96 is forward biased and a positive voltage is applied to terminal 104. The positive voltage at terminal 104 causes a negative going step change and a negative going ramp at terminal 64. The ram is coupled to terminal 57 and has a slope determined by resistor 52 and capacitor 56. The positive voltage supplied from terminal 104 to resistor 48 is subtracted in amplifiers 62 and 68 from the voltage at terminal 57, causing both diodes 78 and 80 to be back biased so field effect transistors 74 and 76 are cut off and resistor 52' is not effectively connected in parallel with resistor 52. When the negative going ramp reaches a predetermined value at t'2, the combined voltage at the output of amplifier 68 again actuates the threshold sensing circuit to remove the forward bias applied to transistor 96.

For reverse running, the operation is similar to that stated for the forward running condition, but transistor 96 is initially forward biased and a positive voltage is applied by amplifier 68 to forward bias diode 78 and transistor 74 during the interval t3-t'3, whereby resistors 52 and 52' are in parallel. During the interval t4-t'4, neither of transistors 74 nor 76 is forward biased, whereby only resistor 52 is effectively in circuit. During the interval t'4-t''4, transistor 76 is again forward biased to reduce the integration time constant.

While there have been described and illustrated one specific embodiment of the invention, it will be clear that variations in the details of the embodiment specifically illustrated and described may be made without departing from the true spirit and scope of the invention as defined in the appended claims.

What is claimed is:

1. A system for controlling a separately excited constant load DC electric motor in response to a source of a control signal defining desired time periods corresponding to desired motor operating conditions and without the use for a feedback circuit responsive to exciting current supplied by the source to the motor, the motor exciting current having a term representing resistive and reactive losses in an electric circuit responsive to the exciting current, comprising simulator means for only the resistive losses, said simulator means being responsive to the control signal for modifying, during at least one of said desired time periods, the magnitude of the control signal in accordance with only the resistive losses the motor is expected to have in response to the control signal during said one time period, and means responsive to said modified control signal for applying a current that is a replica of the modified control signal to the motor armature, and independent of a response from any feedback circuit responsive to the motor armature current to preclude the need for any feedback circuit responsive to the armature current, said control signal being independent of actual motor operating current.

2. The system of claim 1 wherein the loss simulator means includes means for simulating the current applied to the motor during transient and steady state intervals of the applied current source, whereby the current during the transient and steady state intervals is modified by the simulated transient and steady state current.

3. The system of claim 2 wherein the current simulating means includes means for simulating the current applied to the motor during an interval while the motor is accelerating differently from the current applied to the motor during an interval while the motor is decelerating.

4. The system of claim 1 or 2 wherein the applying means and the simulator means includes means for controlling the speed of motor rotation in both directions.

5. The system of any of claims 2 or 4 wherein the simulator means includes an integrating means responsive to current derived from the source.

6. The system of claim 1 wherein the simulator means includes an integrating means responsive to current derived from the source.

7. The system of claim 3 wherein the simulator means includes an integrating means responsive to current derived from the source.

8. The system of claim 7 wherein the integrating means includes means for selectively changing the time constant of the integrator means so the time constants during acceleration and deceleration differ.

9. A system for controlling a separately excited constant load DC electric motor in response to a source of current for the desired motor speed comprising means responsive to the source for applying current to the motor armature, motor loss simulator means responsive to the current derived from the source for modifying the current derived from the source and applied to the motor in accordance with the losses the motor is expected to have in response to the current derived from the source, whereby the actual motor speed corresponds with the desired motor speed despite the losses, said simulator means including an integrating means responsive to current derived from the source, and a resistor connected in parallel with the integrating means, a differential amplifier having a feedback loop, said feedback loop including a capacitor having one terminal connected to one end of the first resistor, the loss simulating means comprising a second resistor connected in the feedback loop, and the modifying means including means for connecting the second resistor between an output of the differential amplifier and said one capacitor terminal.

10. A system for controlling a separately excited constant load DC electric motor in response to a source of current for the desired motor speed comprising means responsive to the source for applying current to the motor armature, motor loss simulator means responsive to the current derived from the source for modifying the current derived from the source and applied to the motor in accordance with the losses the motor is expected to have in response to the current derived from the source, whereby the actual motor speed corresponds with the desired motor speed despite the losses, said loss simulator means including means for simulating the current applied to the motor during transient and steady state intervals of the current source, whereby the applied current during the transient and steady state intervals is modified by the simulated transient and steady state current, said current simulating means including means for simulating the current applied to the motor during an interval while the motor is accelerating differently from the current applied to the motor ;during an interval while the motor is decelerating, said current simulating means including an integrating means responsive to current derived from the source, said integrating means including means for selectively changing the time constant of the integrator means so the time constants during acceleration and deceleration differ, a resistor connected in parallel with the integrating means, a differential amplifier having a feedback loop, said feedback loop including a capacitor having one terminal connected to one end of the first resistor, the loss simulating means comprising a second resistor connected in the feedback loop, and the modifying means including means for connecting the second resistor between an output of the differential amplifier and said one capacitor terminal.

11. The system of claim 10 wherein the integrating means includes third and fourth resistors selectively connected to the capacitor of the integrating means to establish the time constants during the motor acceleration and deceleration.

12. The system of claim 11 further including switching means for selectively connecting one or both of the resistors in circuit with the capacitor, said switching means including at least one switch controlled in response to a signal derived from the said control source.

13. In combination, a separately excited constant load DC electric motor, said motor, when supplied with an excitation current, having losses due to resistive and reactive components of the motor, a source of a control signal defining desired time periods corresponding to desired motor operating conditions, motor loss similator means for only the losses due to the resistive components, said simulator means being responsive to the control signal for modifying, during at least one of said desired time periods, the magnitude of the control signal in accordance with only the resistive losses the motor is expected to have in response to the control signal during said one time period, and means responsive to said modified control signal for applying a current that is a replica of the modified control signal to the motor armature, and independent of a response from any feedback circuit responsive to the motor armature current to preclude the need for any feedback circuit responsive to the armature current, said control signal being independent of actual, motor operating current.

14. A system for controlling a separately excited constant load DC electric motor in response to a source of a control signal and without the use for a feedback circuit responsive to exciting current supplied by the source of the motor, said motor, when supplied with an excitation current, having losses due to resitive and reactive components of the motor, comprising motor loss simulator means for only the losses due to the resistive components, said simulator means being responsive to the control signal for modifying the magnitude of the control signal in accordance with only the resistive losses the motor is expected to have in response to the control signal, and feed forward means responsive to said modified control signal for applying a current that is a replica of the modified control signal to the motor armature and independent of a response from any feedback circuit responsive to the motor armature current to preclude the need for any feedback circuit responsive to the armature current, said control signal being independent of actual motor operating conditions.

15. In combination, a separately excited constant load DC electric motor, said motor, when supplied with an excitation current, having losses due to resistive and reactive components of the motor, a source of a control signal, motor loss simulator means for only the losses due to the resistive components, said simulator means being responsive to the control signal for modifying the magnitude of the control signal in accordance with only the resistive losses the motor is expected to have in response to the control signal, and feed forward means responsive to said modified control signal for applying a current that is a replica of the modified control signal to the motor armature and independent of a response from any feedback circuit responsive to the motor armature current to preclude the need for any feedback circuit responsive to the armature current, said control signal being independent of actual motor operating conditions.

* * * * *